C. I. DODSON.
FASTENER FOR FEED HEADS.
APPLICATION FILED JAN. 4, 1912.
1,073,101. Patented Sept. 16, 1913.
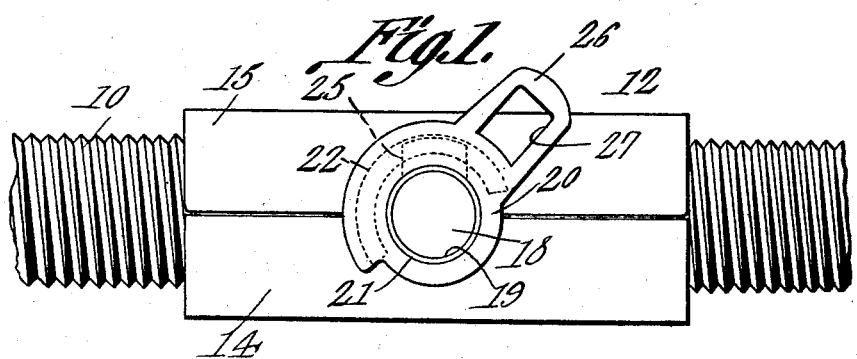
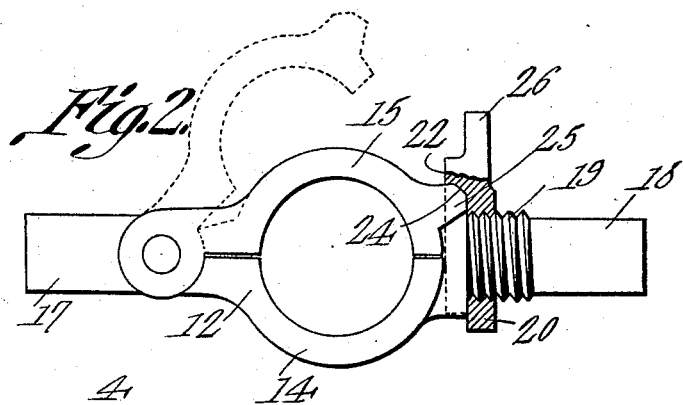
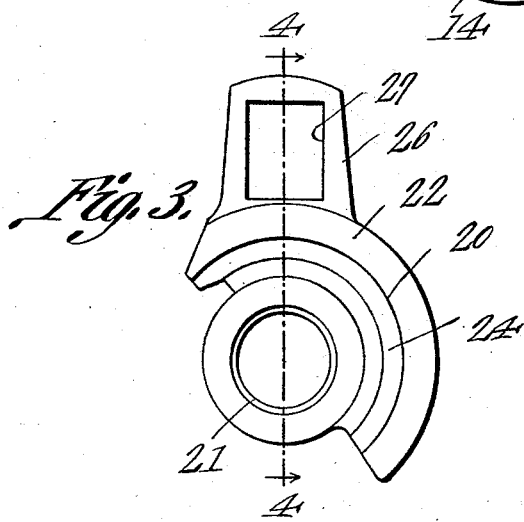
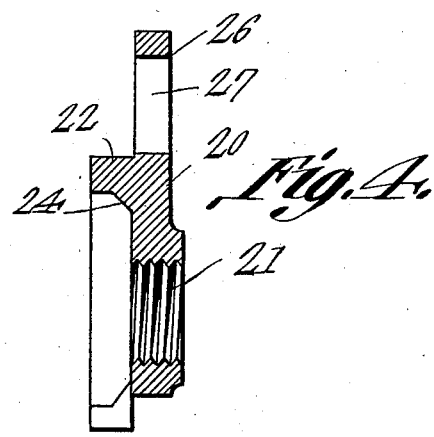
Charles I. Dodson, Inventor

UNITED STATES PATENT OFFICE.

CHARLES I. DODSON, OF PITTSBURG, KANSAS, ASSIGNOR TO FUNK BROTHERS, OF CHICAGO HEIGHTS, ILLINOIS.

FASTENER FOR FEED-HEADS.

1,073,101.      Specification of Letters Patent.      Patented Sept. 16, 1913.

Application filed January 4, 1912. Serial No. 669,520.

*To all whom it may concern:*

Be it known that I, CHARLES I. DODSON, a citizen of the United States, residing at Pittsburg, in the county of Crawford and State of Kansas, have invented a new and useful Fastener for Feed-Heads, of which the following is a specification.

The present invention relates to improvements in fasteners for feed heads, one object of the present invention being the provision of a lock for a sectional screw threaded feed head, which will effectually hold the hinge members which constitute the feed head together and which may be readily removed when it is desired to return the threaded shaft or bar.

In the drawings Figure 1 is a view showing the device positioned on the bar. Fig. 2 is an end elevation, one of the hingedly connected members being shown raised in dotted lines. Fig. 3 is an elevation of the locking face of the rotating locking member, and Fig. 4 is a section taken on the line 4—4 of Fig. 3.

In the drawings, 10 designates the threaded bar, which is fed through the nut or boxing 12. This nut consists of the hingedly connected members 14 and 15 which form the cylindrical interiorly threaded box, the lower section 14 being formed with trunnions 17 and 18 which are held against movement as the bar 10 is advanced.

The trunnion 18 is formed with the screw threaded portion 19 and disposed on said screw threaded portion is the locking member 20. This locking member consists of the interiorly screw threaded portion 21 which embraces the screw threaded portion of the trunnion and formed integral with said portion 21 is the semi-circular concaved locking member 22. This concaved member is provided with a cam face 24 which is adapted as shown in Fig. 2, to contact with a lug 25 carried by the pivoted member 15 of the nut. The member 20 is manipulated by means of the handle 26, said handle being provided with an opening 27, to permit the member to be readily advanced or retarded on the screw threaded portion 19 of the trunnion 18. Thus when the member 15 is in the position shown in Fig. 2, the member 20 may be rotated, until its cam face 24 contacts with the lug 25, preventing the member 15 from being lifted.

Particular attention is called to the peculiar construction of the member 20 and the manner in which the same may be readily brought into and out of contact with the lug 25, thus allowing the member 15 to be readily lifted when it is desired to return the screw threaded bar 10. The many advantages of a locking mechanism of this character will be clearly apparent as it will be noted that the same may be easily and economically manufactured, the entire device constituting but three elements, and the locking member being such as may be readily brought into and out of contact with the upper section of the nut.

What is claimed is:

A fastener for a drilling machine feed head, composed of two hinged members, one member of which is provided with a cylindrical boss with exterior screw threads, and the other member of which is provided with an offset lug disposed to, when the members are together, rest without the screw threads and adjacent the point of junction of the boss with the first member, and a lug engaging member rotatably mounted upon the threaded boss and having a projecting segmental grooved rim to receive the lug to lock the sections together.

In testimony that I claim the foregoing as my own, I have hereto affixed my signature in the presence of two witnesses.

CHARLES I. DODSON.

Witnesses:
ORA FRITZ,
H. H. OZBUN.

Copies of this patent may be obtained for five cents each, by addressing the "Commissioner of Patents, Washington, D. C."